United States Patent [19]
Deville

[11] Patent Number: 5,909,646
[45] Date of Patent: Jun. 1, 1999

[54] SYSTEM FOR ESTIMATING SIGNALS RECEIVED IN THE FORM OF MIXED SIGNALS

[75] Inventor: Yannick Deville, Villecresnes, France

[73] Assignee: U.S. Philips Corporation, New York, N.Y.

[21] Appl. No.: 08/602,535

[22] Filed: Feb. 20, 1996

[30] Foreign Application Priority Data

Feb. 22, 1995 [FR] France .................................. 95 02051

[51] Int. Cl.⁶ .................................................. H04B 15/00
[52] U.S. Cl. ........................... 455/313; 455/67.3; 706/22
[58] Field of Search .................................... 455/313, 501, 455/296, 226.1, 67.3; 364/559, 574, 572, 570, 582, 728.03; 395/20, 23, 27; 381/94; 342/178, 153; 375/232, 346, 349, 350, 209, 210; 706/14, 22

[56] References Cited

U.S. PATENT DOCUMENTS

| | | | |
|---|---|---|---|
| 4,513,383 | 4/1985 | Hackett, Jr. .............................. | 364/582 |
| 4,780,721 | 10/1988 | Dobson ................................... | 342/178 |
| 4,965,732 | 10/1990 | Roy, III et al. .......................... | 342/153 |
| 5,272,656 | 12/1993 | Genereux .................................. | 395/27 |
| 5,383,164 | 1/1995 | Sejnowski et al. ...................... | 455/501 |
| 5,459,668 | 10/1995 | Dogan et al. ........................ | 364/728.03 |
| 5,539,832 | 7/1996 | Weinstein et al. ......................... | 381/94 |
| 5,694,388 | 12/1997 | Sawahashi et al. ...................... | 375/210 |
| 5,706,402 | 1/1998 | Bell .......................................... | 395/23 |

OTHER PUBLICATIONS

Lacoume et al., "Separation of Independent Sources From Correlated Inputs", IEEE Transactions on Signal Processing, vol. 40, No. 12, Dec. 1992, pp. 3074–3078.

*Primary Examiner*—Nguyen Vo
*Assistant Examiner*—Lester G. Kincaid, Jr.
*Attorney, Agent, or Firm*—Michael E. Belk; Bernard Franzblau

[57] ABSTRACT

Source separation system for processing input signals ($E_i(t)$) formed by instantaneous linear mixtures of primary signals ($X_j(t)$) that result from sources (S1–Sn) and for producing at least one estimated primary signal ($x_k(t)$). The system includes separation apparatus (10) and characterization apparatus (15) which determine cumulants of the input signals for extracting estimated mixing coefficients ($\alpha_{ij}$). The coefficients are transformed into separation coefficients ($C_{ki}$, $d_{ki}$) in the separation apparatus (10). The separation apparatus (10) may have a direct structure or a recursive structure.

13 Claims, 2 Drawing Sheets

SYSTEM FOR ESTIMATING SIGNALS RECEIVED IN THE FORM OF MIXED SIGNALS

FIELD OF THE INVENTION

This invention relates to a source separation system for processing input signals formed by instantaneous linear mixtures of primary signals that result from sources and for producing at least one estimated primary signal, which mixtures cause mixing coefficients to occur, the system comprising source separation means which have a number of inputs connected to the input signals and at least one output for producing the estimated primary signal, the source separation means adaptively determining separation coefficients which are used for extracting the estimated primary signals.

The invention likewise relates to the application of such a system to the reception of electric signals, sound signals, electromagnetic signals. It may relate, for example, to an aerial, a car radio or to a hands-free telephone.

BACKGROUND OF THE INVENTION

The technique of separating primary signal sources, which consists of processing mixtures of primary signals to produce an estimate of each primary signal, is known. Said technique is applied to primary signals resulting from independent sources, which signals are only available in the form of said mixtures. This may relate to convolutional linear mixtures or instantaneous linear mixtures. They may be generated by propagation mechanisms of primary signals and/or by superposition mechanisms for signals that result from various sources or other causes.

Generally, the technique of source separation works "in the blind", that is to say, the sources are supposed to be unknown, to be independent, to have unknown mixtures. Therefore, various samples of said mixtures are detected on the basis of which the use of separation algorithms permits of restoring one or various estimates of the original primary signals.

Such a technique, applied to the separation of instantaneous linear signal mixtures is disclosed, for example, in the document entitled "Separation of Independent Sources from Correlated Inputs" by J. L. Lacoume and P. Ruiz, IEEE Transactions on Signal Processing, Vol. 40, No. 12 Dec. 1992, pages 3074 to 3078.

For effecting the source separation, that is to say, obtaining on the output an estimate of each source that forms the mixture, this document reveals a method of calculating cumulants, For this purpose, it teaches to adapt parameters of the source separation system in such a way that cumulants of output signals which are expressed as a function of cumulants measured on the input signals resulting from the mixtures are set to zero, while the cumulants are of a higher order than the second order. By setting these cumulants to zero, inverse mixing coefficients are indirectly derived to obtain an inverse transform of the transform obtained from the application of mixing operations to the primary signals. The teaching of this document leads to giving a direct structure to the system of source separation. Moreover, as the input signals are statistically dependent because they result from mixtures, the equations that link the cumulants of the output signals to the cumulants of the input signals are very complex.

Such a technique has turned out to be very complex to implement and does not yield a simple solution in the case of real signals which generally result from instantaneous linear mixtures.

SUMMARY OF THE INVENTION

It is an object of the invention to simplify the processing that leads to distinguishing the sources by producing estimated primary signals.

This object is achieved with a source separation system that comprises characterization means which have a number of inputs connected to the input signals for estimating the mixing coefficients based upon these signals, and have at least one output for producing estimated mixing coefficients, while the separation means have at least one further input for receiving the estimated mixing coefficients and comprise means for transforming the estimated mixing coefficients into separation coefficients.

Advantageously, an estimation is obtained of the mixing coefficients themselves and not an estimation of the inverse mixing coefficients. This property ensures a source separation that is much more precise, while the estimated primary signals are nearer to the primary signals. In addition, the source separation means may thus have a recursive structure which is more compact.

Preferably, the characterization means comprise estimating means for making estimates of cumulants of a higher order than the second order based upon the input signals, and calculating means for calculating estimated coefficients for transforming the estimates of said cumulants into estimated mixing coefficients.

Advantageously, the processing is simplified by establishing a relation between the cumulants of the input signals and the cumulants of the source signals. As the sources are statistically independent, it follows that the equations are much simpler, thus easier to resolve than in the prior art, which calls for less considerable processing means.

More particularly, the estimated coefficient calculating means comprise a neuron network for transforming, in accordance with a predetermined transform function, the estimates of said cumulants into estimated mixing coefficients.

An interesting field of application of the invention is that where the primary signal sources and/or receivers are mobile, which entail variable transmission conditions.

These and other aspects of the invention will be apparent from and elucidated with reference to the embodiments described hereinafter.

DESCRIPTION OF EMBODIMENTS

Figure 1:
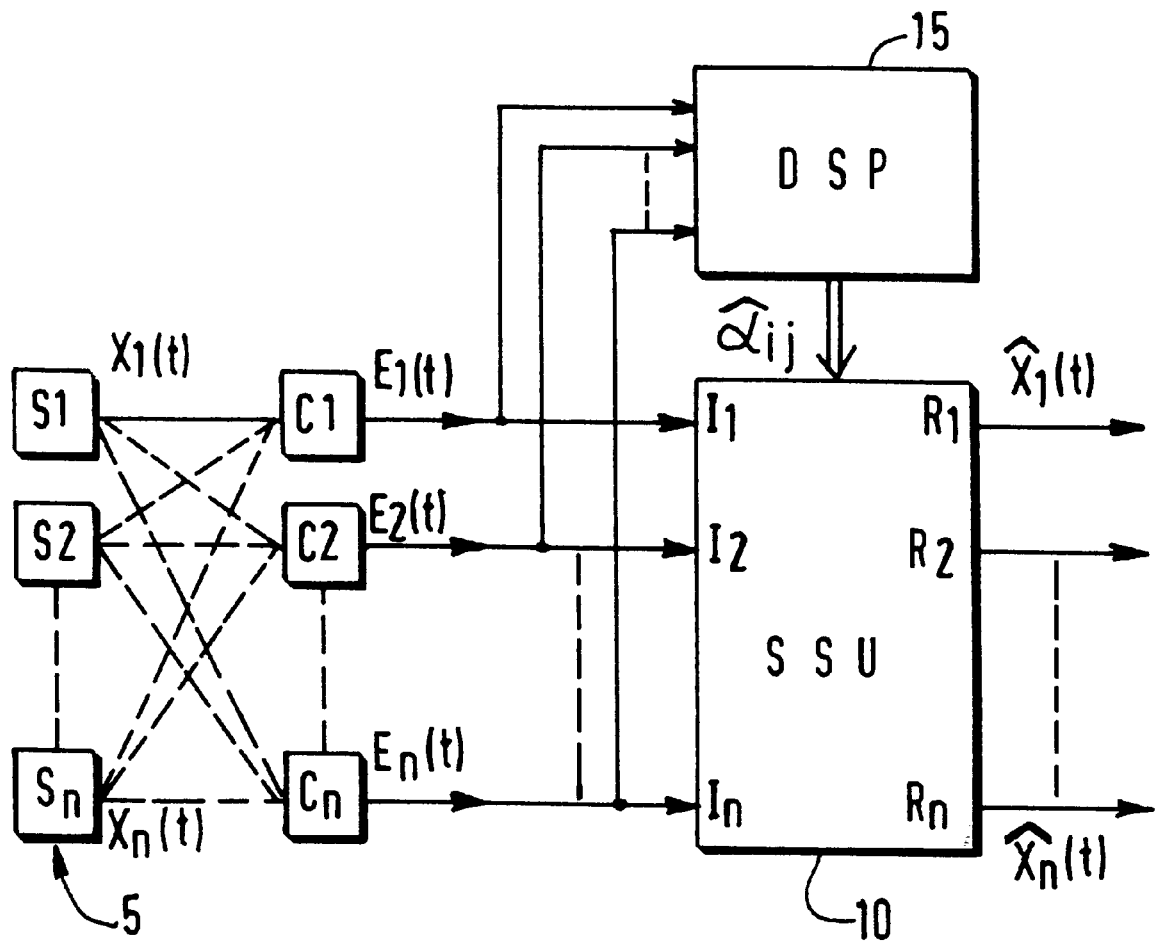
FIG. 1 shows a diagram of a source separation system according to the invention.

In FIG. 1 are represented the primary sources 5, S1 to Sn, formed, for example, by various RF transmitters. For identifying and separating these transmitters, sensors C1–Cn are put up at various receiving points. Each of these sensors is, for example, an antenna followed by an amplifier and a demodulator. The sensors produce signals $E_1(t)$ to $E_n(t)$ resulting from mixtures of primary signals $X_1(t)$ to $X_n(t)$ which are either produced directly by the sources S1 to Sn, or are used for modulating signals broadcast by the sources S1 to Sn.

The mixtures which are produced between the primary signals are directly linked to the propagation of these signals in space. These mixtures may be rendered completely or approximately linear and instantaneous by utilizing transmitters and adequate sensors, notably by selecting the types of modulators and demodulators used, as well as the operating frequencies of the system, for example, by selecting transmitters that use an amplitude modulation.

In FIG. 1 the detected signals $E_1(t)$ to $E_n(t)$ enter a source separation unit 10 which produces estimated primary signals $\hat{X}_1(t)$ to $\hat{X}_n(t)$, where the variable t is, for example, time. The mixed input signals $E_1(t)$ to $E_n(t)$ are instantaneous linear mixtures, generally caused by p unknown primary signals $X_1(t)$ to $X_p(t)$, so that:

$$E_i(t) = \sum_j a_{ij} X_j(t) \quad (1)$$

where $1 \leq i \leq n$ and $1 \leq j \leq p$, where i and j are current variables. In FIG. 1, n=p.

These primary signals are supposed to be statistically independent, preferably up to at least the fourth order. This preference may be changed to at least the third order in certain cases.

The coefficients $a_{ij}$ are mixing coefficients which define the contributions of the signal $X_j(t)$ to the mixed signal $E_i(t)$. The mixing coefficients $a_{ij}$, which are unknown, are constant values or slowly variable values.

For the following description, primary normalized signals are defined, so that:

$$Y_j(t) = a_{jj} X_j(t) \text{ for } 1 \leq j \leq p \quad (2)$$

and normalized mixing coefficients so that:

$$\alpha_{ij} = a_{ij}/a_{jj} \text{ for } i \neq j. \quad (3)$$

For i=j one has $\alpha_{ii} = \alpha_{jj} = 1$.
After this normalization, equation (1) becomes $$E_i(t) = Y_i(t) + \sum_j \alpha_{ij} \cdot Y_j(t) \text{ for } 1 \leq i \leq n, 1 \leq j \leq p \text{ and } j \neq i. \quad (4)$$

The normalized mixing coefficients $a_{ij}$ will henceforth be simply called mixing coefficients.

For producing estimated primary signals $\hat{X}_k(t)$ on the basis of the input signals $E_i(t)$, the separation unit 10 in the case where it has a direct structure, utilizes separation coefficients $C_{ki}$. It produces estimated primary signals by performing the inverse transformation (k, output running index):

$$\hat{X}_k(t) = \sum_i C_{ki} \cdot E_i(t) \text{ with } 1 \leq i \leq n \text{ and } 1 \leq k \leq n. \quad (5)$$

The separation coefficients $C_{ki}$ are determined in the separation unit 10 on the basis of estimated mixing coefficients $\hat{\alpha}_{ij}$ which form an estimate of the mixing coefficients $\alpha_{ij}$ which are unknown. This estimate is obtained in a characterization unit 15 which produces the estimated mixing coefficients (FIG. 1) on the basis of input signals $E_i(t)$.

Analogously, the separation unit (10) may have a recursive structure in which separation coefficients $d_{ki}$ are used.

Figure 2:
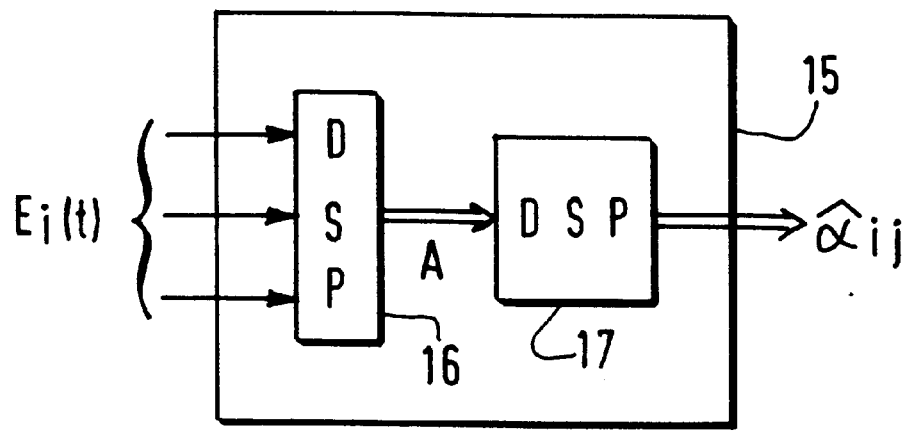
FIG. 2 shows a diagram of a characterization unit according to the invention.

FIG. 2 shows a diagram of the characterization unit 15. It comprises an estimation unit 16 followed by an estimated coefficient calculation unit 17. The estimation unit 16 receives the set of input signals $E_i(t)$ and forms an estimate of a set A of characteristic magnitudes of the input signals $E_i(t)$. These characteristic magnitudes of set A are selected so that it is firstly possible to calculate them on the basis of the input signals $E_i(t)$ and secondly to express them from the mixing coefficients $\alpha_{ij}$ and from a set B of characteristic magnitudes which relate to the normalized primary signals $Y_j(t)$, although they are unknown, while the characteristic magnitudes of set B are of the same type as the characteristic magnitudes of set A.

In the following description, the selected characteristic magnitudes will be cumulants calculated on the basis of the mixed signals $E_i(t)$.

The relations linking set A and set B via mixing coefficients form an intrinsic property of the described system. According to the invention, the estimation unit 16 determines an estimate of set A, which estimate is sufficient for estimated mixing coefficients $\hat{\alpha}_{ij}$ to be derived therefrom in the estimated coefficient calculation unit 17.

According to a preferred embodiment, the characteristic magnitudes which form set A are autocumulants associated to each mixed signal $E_i(t)$ which has previously been centered, as well as cross-cumulants associated to each pair of mixed signals $E_f(t)$ and $E_g(t)$ previously centered (f and g being integral indices, $1 \leq f \leq n$, $1 \leq g \leq n$). Analogously, the characteristic magnitudes which form set B are autocumulants associated to each normalized primary signal $Y_i(t)$ that has previously been centred. The definition of these magnitudes is well known per se to a person skilled in the art.

According to the invention, one considers the cumulants (autocumulants and cross-cumulants) of an order higher than the second order. The cumulants which can be calculated in the simplest way are those that have the lowest order. Nevertheless, the third-order cumulants must be sufficiently large for the calculation to be limited to only these cumulants. This condition occurs only for a limited number of types of sources. Preferably, according to the invention, fourth-order cumulants are calculated which allows of coverage of a larger spectrum of experimentally found signals. A person of ordinary skill in the art may choose cumulants of a different order, without departing from the scope of the invention.

For, clarity's sake, a repetition of the definitions of the cumulants will be given hereinafter, while only the cumulants necessary for the discussed example will be confined to, that is to say, the autocumulants and the fourth-order cross-cumulants, while two signals will be confined to, and without causing a time shift to occur between the two signals of interest.

In the general case, let us consider two signals U(t) and V(t) which vary as a function of a variable t, for example, time. Centred signals are defined by:

$$u(t) = U(t) - E\{U(t)\} \quad (6)$$

$$v(t) = V(t) - E\{V(t)\} \quad (7)$$

In the equations described above, the notation $E\{.\}$ represents the mathematical expectation of the expression in parentheses.

The five fourth-order cumulants associated with these centered signals are (while abbreviating by u and v, the signals u(t) and v(t), respectively):

$$cum4(u) = cum(u,u,u,u) = E\{u^4\} - 3[E\{u^2\}]^2 \quad (8)$$

$$cum31(u,v) = cum(u,u,u,v) = E\{u^3 v\} - 3E\{u^2\}E\{uv\} \quad (9)$$

$$cum22(u,v) = cum(u,u,v,v) = E\{u^2v^2\} - E\{u^2\}E\{v^2\} - 2[E\{uv\}]^2 \quad (10)$$

$$cum31(v,u) = cum(u,v,v,v) = E\{v^3u\} - 3E\{v^2\}E\{uv\} \quad (11)$$

$$cum4(v) = cum(v,v,v,v) = E\{v^4\} - 3[E\{v^2\}]^2 \quad (12)$$

In practice, the exact cumulants are not calculated, but only estimated cumulants. Various techniques for calculating cumulants are known to a person skilled in the art. By way of example, only two methods will be provided hereinafter.

A first, simple method for calculating cumulants consists of executing the following operations:

1. In one time window, take M samples for each signal U(t) and V(t).

2. Based upon these samples, make estimates of the mathematical expectations of the signals U(t) and V(t) by calculating two estimators <U> and <V>. Each estimator is, for example, the arithmetic mean of the signal of interest calculated over the M samples taken. These estimators <U> and <V> are real numbers.

3. Estimators <u(t) > and <v(t) > which relate to the centred signals u(t) and v(t) are derived from the equations 6 and 7 and estimators <U> and <V>. These first estimators contain M samples which are, for example, calculated in the following manner. The respective estimator <u(t)> or <v(t)> of the centred signal u(t) or v(t) is calculated by subtracting from each sample of the initial signal U(t), V(t) respectively, the estimator <U> of the mathematical expectation E{U(t)}, estimator <V> of the mathematical expectation E{V(t)}, respectively. [equations 6 and 7 applied to the estimators].

4. The same calculation method is applied for the estimators of all the mathematical expectations which occur in the equations 8 to 12. For example, the estimator of $E\{u^4\}$ will be obtained by calculating the arithmetic mean of $[<u(t)>]^4$ of M samples. Similar calculations hold for the other mathematical expectations to be calculated.

5. An estimate for each cumulant defined by the equations 8 to 12 is derived therefrom by replacing the mathematical expectations by their respective estimates.

A greater precision can be obtained in the estimate of the cumulants by applying a second method which consists of subdividing the window that contains the M samples into various sub-windows. The first method is applied for each sub-window to produce partial cumulants. Then, the cumulants are calculated for the set of M samples (equations 8 to 12) by calculating the arithmetic means of the partial cumulants.

Other calculation methods for calculating the cumulants can be used.

For a proper understanding of the invention, let us consider, by way of example, the simple case of the separation of 2 sources while 2 sensors are used. In this example there will only be considered the fourth-order autocumulants and cross-cumulants. Two signals $E_1(t)$ and $E_2(t)$ are detected which, after centering, become the signals $e_1(t)$ and $e_2(t)$. Similarly, $y_1(t)$ and $Y_2(t)$ are the centering signals corresponding to the normalized signals $Y_1(t)$ and $Y_2(t)$ assumed to be independent.

By applying that which has previously been discussed, the following 5 equations are obtained:

$$cum4(e1) = cum4(y1) + \alpha^4_{12} cum4(y2) \quad (13)$$

$$cum31(e1,e2) = \alpha_{21} cum4(y1) + \alpha^3_{12} cum4(y2) \quad (14)$$

$$cum22(e1,e2) = \alpha^2_{21} cum4(y1) + \alpha^2_{12} cum4(y2) \quad (15)$$

$$cum31(e2,e1) = \alpha^3_{21} cum4(y1) + \alpha_{12} cum4(y2) \quad (16)$$

$$cum4(e2) = \alpha^4_{21} cum4(y1) + cum4(y2) \quad (17)$$

These equations contain:

i) the elements of already defined set A, that is to say, the elements that characterize the signals produced by the sensors, that is: cum4(e1), cum31(e1,e2), cum22(e1,e2), cum31(e2,e1), cum4(e2).

ii) the elements of already defined set B, that is to say, elements characterizing the normalized primary signals, that is: cum4(y1), cum4(y2) which are unknown.

iii) two unknown mixing coefficients: $\alpha_{12}$, $\alpha_{21}$. While disposing of 5 equations, it is thus theoretically possible to determine the unknown elements.

In the case of more than two sources, with a number of sensors equal to the number of sources, the cumulants cum4 (equations 13 and 17) and the cumulants cum31 (equations 14 and 16) are, for example, generalized respectively, so that:

$$cum4(e_r) = cum4(y_r) + \sum_{j=1, j \neq r}^{n} \alpha^4_{rj} cum4(y_j) \quad (18)$$

$$cum31(e_r, e_s) = \alpha_{sr} cum4(y_r) + \alpha^3_{rs} cum4(y_s) + \sum_j \alpha^3_{rj} \alpha_{sj} sum4(y_j) \quad (19)$$

with $1 \leq j \leq n$, $j \neq r$ and $j \neq s$, and $1 \leq r \leq n$, $1 \leq s \leq n$, and $r \neq s, r, s$ being current integer values.

The aim of this calculation (the case of two sources and two sensors) is to determine the mixing coefficients $\alpha_{12}$, $\alpha_{21}$ in reality, the calculation is made to determine solely estimates of the mixing coefficients $\alpha_{12}$, $\alpha_{21}$ in the form of estimated coefficients $\hat{\alpha}_{12}$, $\hat{\alpha}_{21}$.

The calculation of the estimated coefficients $\hat{\alpha}_{12}$, $\hat{\alpha}_{21}$ is made in the characterization unit 15 (represented in FIG. 2). Firstly, the estimation unit (16) determines the estimates of the cumulants of the mixed signals, after which estimated coefficient calculation unit (17) produces the estimated coefficients $\hat{\alpha}_{12}$, $\hat{\alpha}_{21}$.

The estimation unit (16) calculates the cumulants cum4 (e1) to cum4(e2) in accordance with equations 8 to 12. The estimation unit DSP can be formed by a calculator, a microprocessor or a digital signal processing unit. When all the previous cumulants have been calculated, they are processed by the coefficient calculation unit 17 which calculates the mixing coefficients $\alpha_{12}$ and $\alpha_{21}$ on the basis of the equations 13 to 17. In reality, the resolution of these equations does not give the real coefficients $\alpha_{12}$ and $\alpha_{21}$, but approximate values which form the estimated coefficients $\hat{\alpha}_{12}$ and $\hat{\alpha}_{21}$, because these are the estimated cumulants and not the exact cumulants that are used for resolving the equations 13 to 17.

The coefficient calculation unit 17 may also be formed by a calculator, a microprocessor or a digital signal processing device which applies an equation resolution method.

For resolving these equations, it is possible to use non-linear equation resolution methods which are known to a person of ordinary skill in the art. They may be Gauss-Newton, Levenberg-Marquardt, Powell-Fletcher algorithms or conventional gradient slope methods.

Another approach consists of reducing the number of equations by combining the equations 13 to 17. Thus, the following equations are obtained:

$$\alpha_{21}{}^3 cum4(e_1) + \alpha_{12} cum4(e_2) - \alpha_{21}{}^3 \alpha_{12} cum31(e_1, e_2) - cum31(e_2, e_1) = 0 \quad (20)$$

$$\alpha_{21} cum4(e_1) + \alpha_{12}{}^3 cum4(e_2) - cum31(e_1, e_2) - \alpha_{12}{}^3 \alpha_{21} cum31(e_2, e_1) = 0 \quad (21)$$

The coefficient calculation unit 17 is in that case programmed for resolving the equations 20 and 21, for example, via one of the known methods indicated previously.

It is possible to combine these two equations to retain only equations containing a single mixing coefficient $\alpha_{12}$ or $\alpha_{21}$ which are easier to resolve.

Another approach can consist of not resolving exactly the system of equations 13 to 17 as has just been observed, but to confine oneself to making an approximation of the function that links the calculated cumulant estimates to the estimated mixing coefficients $\hat{\alpha}_{ij}$ which are to be determined. In effect, the equations 13 to 17 may coarsely be described in the form of:

$$\alpha_{ij}=F(A). \tag{22}$$

Equation 22 has only for its aim to link the unknown coefficients $\alpha_{ij}$ to set A, without considering set B which, although likewise unknown, need not be calculated.

If G(.) is a function that forms an approximation of F(.), and if G(.) is simpler to use experimentally, one may restrict oneself to calculating:

$$\hat{\alpha}_{ij}=G(A). \tag{23}$$

This function F(.) is characteristic of the number of primary signals and sensors which are necessary for utilizing the application of interest. This forms an advantage, because the system itself is independent of the other parameters of the application. It will easily be understood that the coefficient calculation unit 17 may first undergo in a first phase a learning process to resolve the function F(.). In a second phase, the data which are measured experimentally can be processed in accordance with the learned method. It is known that an approximate value of the function F(.) can be obtained via a function G(.) by utilizing a multilayer neuron network or a multilayer perceptron or a tree-like neuron network.

The use of a neuron network is particularly interesting, because it does not require each time for each batch of cumulants the resolution of the equations 13 to 17 in the separation system itself. It is sufficient that the neuron network learns beforehand to resolve the function G(.), so that it can subsequently be used for each batch of cumulants, while the source separation system thus becomes assigned to the type of function G(.) learned. To adapt the source separation system to a number of sensors or to a different number of primary signals to be separated, it is sufficient to have the neuron network again learn the new function G(.) that relates to this new number of sensors and/or to this new number of primary signals. To generate the array of examples necessary for the learning process, arbitrary autocumulant values are chosen for the primary signals as well as arbitrary values for the normalized mixing coefficients $\alpha_{ij}$ (terms on the right in the equations 13 to 17). With the aid of these equations, the autocumulants and the cross-cumulants of the mixed signals are calculated (term on the left in said equations). Then, these cumulants of the mixed signals are introduced on the inputs of the neuron network and there is imposed that its outputs produce the normalized mixing coefficients $a_{ij}$ selected previously. These produced coefficients $\alpha_{ij}$ form the results to be obtained on the output of the neuron network. The learning of the neuron network will thus consist of determining the synaptic coefficients of the neuron network to approximate the input/output signal correspondence of the neuron network in conformity with the precalculated results of the equations 13 to 17. This provides the advantage of not having to resolve the complex equations 13 to 17.

The estimated mixing coefficients $\hat{a}_{ij}$ thus calculated are applied to source separation unit 10 to demix the input signals $E_i(t)$ and produce estimated primary signals $\hat{X}_k(t)$.

The source separation effected by the source separation unit 10 may be written in the form of:

$$\hat{X}_k(t) = \sum_{i=1}^{n} C_{ki} \cdot E_i(t) \tag{24}$$

for the direct structure, and $$\hat{X}_k(t) = E_k(t) - \sum_{i=1 i \neq k}^{n} d_{ki} \cdot \hat{X}_i(t) \tag{25}$$

for a recursive structure.

The coefficients $C_{ki}$, $d_{ki}$ are separation coefficients which are derived from the estimated mixing coefficients $\hat{\alpha}_{ij}$ which enter the separation unit 10.

The transformation of the estimated mixing coefficients $\hat{\alpha}_{ij}$ into separation coefficients $C_{ki}$, $d_{ki}$ depends on the direct or recursive structure of the separation unit 10.

If the separation unit 10 has a recursive structure, one may be led to performing either of the following transformations:

$$d_{ki}=\hat{\alpha}_{ki} \text{ or}$$

$$d_{ki}=\alpha_{k,\sigma(i)}/\alpha_{i,\sigma(i)} \tag{26}$$

The first of these transformations corresponds to the case where the estimated primary signal corresponding to the $k^{th}$ order primary signal is found back on the $k^{th}$ output of the separation unit.

But cases may occur where stability problems do not allow this correspondence to be established. It may thus be necessary to provide that the estimated primary signal corresponding to the $k^{th}$ order primary signal is produced on another output of the separation unit. Appropriate separation coefficients $d_{ki}$ must thus be determined which make it possible to perform this permutation. This is the aim of the second transformation which uses a permutation law $\sigma(i)$ for the indices.

In the case of two sources, with two estimated coefficients $\hat{\alpha}_{12}$ and $\hat{\alpha}_{21}$, the separation coefficients $d_{ki}$ are selected such that:

$$\text{if } \hat{\alpha}_{12}.\hat{\alpha}_{21} \leq 1, \text{ one has } d_{12}=\hat{\alpha}_{12}; d_{21}=\hat{\alpha}_{21}. \tag{27}$$

for the first transformation, and $$\text{if } \hat{\alpha}_{12}.\hat{\alpha}_{21} < 1, \text{ one has } d_{12}=1/\hat{\alpha}_{21}; d_{21}=1/\hat{\alpha}_{12} \tag{28}$$

for the second transformation.

When the source separation unit 10 has a direct structure, a matrix inversion is to be made so that:

$$C_{kj} + \sum_{i=1, i \neq j}^{n} C_{ki} \cdot \hat{\alpha}_{ij} = 0 \tag{29}$$

$$1 \leq k \leq n$$

$$1 \leq j \leq n, j \neq k,$$

with $C_{kk}=1$.

Figure 3:
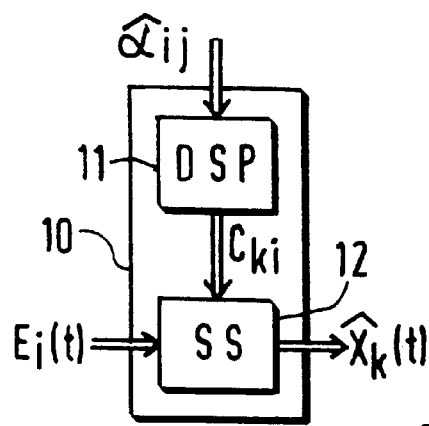
FIG. 3 shows a diagram of a source separation unit according to the invention comprising a transformation unit for transforming estimated mixing coefficients into separation coefficients.

The transformations of the equations 26 to 28 in the case of the recursive structure or the matrix inversion of the equation 29 in the case of the direct structure are realized in the transformation unit 11 DSP, for example, a calculator, a microprocessor or a digital signal processing unit. In this case (FIG. 3) the source separation unit 10 comprises the transformation unit 11 which transforms the estimated mixing coefficients $\hat{\alpha}_{ij}$ into separation coefficients $C_{ki}$, $d_{ki}$, and a separation sub-unit 12 which receives on a number of inputs the mixed signals $E_i(t)$ and which produces at least one estimated primary signal $\hat{X}_k(t)$. The separation coefficients $C_{ki}$, $d_{ki}$ arrive on another number of inputs.

Figure 4:
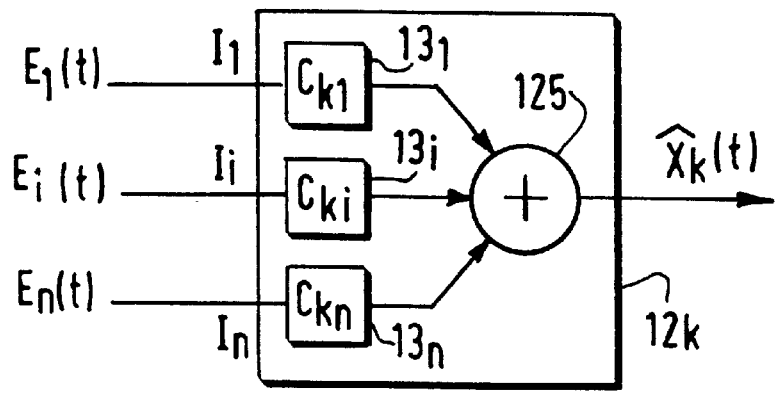
FIG. 4 shows a partial diagram of a first illustrative embodiment of the separation unit in the case of a direct structure.

FIG. 4 represents part of a separation sub-unit $12_k$ which has a direct structure. It comprises a number of inputs $I_1$ to $I_n$ which receive each a mixed signal $E_1(t)$ to $E_n(t)$. Each of these inputs is connected to a multiplier means $13_1$, to $13_n$ for said signal via the separation coefficient $C_{k1}$ to $C_{kn}$ assigned to the input. The outputs of all the multiplier means $13_1$ to $13_n$ are connected to a summator 125 for adding together all the signals and producing the estimated primary signal $\hat{X}_k(t)$. The separation sub-unit 12 (FIG. 3) contains as many partial sub-units $12_k$ as there are estimated primary signals $\hat{X}_k(t)$.

Figure 5:
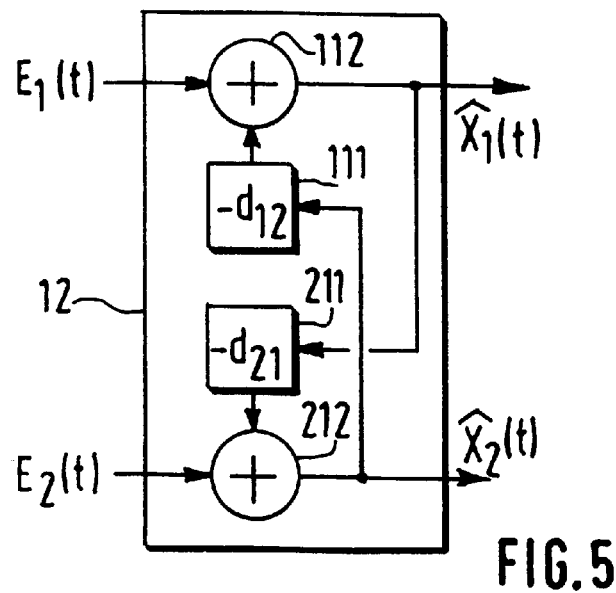
FIG. 5 shows a partial diagram of a second illustrative embodiment of the separation unit in the case of a recursive structure.

FIG. 5 represents a separation sub-unit 12 which has a recursive structure for an example intended to produce two estimated primary signals $\hat{X}_1(t)$ and $\hat{X}_2(t)$ based on two mixed signals $E_1(t)$ and $E_2(t)$. This structure comprises a first summator 112 which has an input connected to the signal $E_1(t)$ and an output which produces the estimated primary signal $\hat{X}_1(t)$. A second summator 212 has an input connected to the signal $E_2(t)$ and an output which produces the estimated primary signal $\hat{X}_2(t)$. Another input of the first summator 112 is connected to the output of the second summator 212 via a multiplier means 111 which weights the output signal of the second summator with a coefficient $-d_{12}$. Similarly, another input of the second summator 212 is connected to the output of a first summator 112 via another multiplier means 211 which weights the output signal of the first summator with a coefficient $-d_{21}$. The summators 112, 212 and the multiplier means 111, 211 may form part of a calculator, a microprocessor or a digital signal processing unit correctly programmed for performing the described functions.

I claim:

1. A source separation system for processing input signals formed by instantaneous linear mixtures of primary signals that result from sources and for producing at least one estimated primary signal, which mixtures cause mixing coefficients to occur, the system comprising:

source separation means having a number of inputs for receiving the input signals and at least one output for producing the estimated primary signal, the source separation means adaptively determining separation coefficients which are used for extracting the estimated primary signals as a linear combination of the input signals; and characterization means having input means coupled to receive the input signals for estimating the mixing coefficients based upon the input signals, and have at least one output for supplying estimated mixing coefficients;

and wherein the source separation means have at least one further input for receiving the estimated mixing coefficients and include means for transforming the estimated mixing coefficients into separation coefficients defining the linear combination of the input signals.

2. The system of claim 1, in which the characterization means comprise estimating means for making estimates of cumulants of a higher order than the second order based upon the input signals, and calculating means for calculating estimated coefficients for transforming the estimates of the cumulants into estimated mixing coefficients.

3. The system of claim 2, in which the estimated coefficient calculating means include a neuron network for transforming, in accordance with a predetermined transform function, the estimates of the cumulants into estimated mixing coefficients.

4. The system of claim 2, in which the separation means have a direct structure and include a transformation unit for transforming estimated mixing coefficients into separation coefficients adapted to the direct structure.

5. The system of claim 2, in which the separation means have a recursive structure and include a transformation unit for transforming estimated mixing coefficients into separation coefficients adapted to the recursive structure.

6. The system of claim 3, in which the separation means have a direct structure and include a transformation unit for transforming estimated mixing coefficients into separation coefficients adapted to the direct structure.

7. The system of claim 3, in which the separation means have a recursive structure and include a transformation unit for transforming estimated mixing coefficients into separation coefficients adapted to the recursive structure.

8. A source separation system for processing input signals formed by instantaneous-linear mixtures of primary signals that result from sources and for producing at least one estimated primary signal, which mixtures cause mixing coefficients to occur, the system comprising:

source separation means responsive to the input signals for providing the at least one estimated primary signal as a linear combination of the input signals; and characterization means responsive to the input signals for estimating the mixing coefficients based upon the input signals so as to obtain estimated mixing coefficients;

and wherein the source separation means receive the estimated mixing coefficients and include means for transforming the estimated mixing coefficients into separation coefficients defining the linear combination of the input signals.

9. The system as claimed in claim 8 wherein the characterization means comprise estimating means for making estimates of cumulants of a higher order than the second order and based upon the input signals, and calculating means for calculating estimated coefficients for transforming the estimates of the cumulants into estimated mixing coefficients.

10. The system as claimed in claim 9 wherein the estimated coefficient calculating means include a neuron network for transforming, in accordance with a predetermined transform function, the estimates of the cumulants into estimated mixing coefficients.

11. The system as claimed in claim 9 wherein the separation means comprise a transformation unit for transforming estimated mixing coefficients into separation coefficients.

12. The system as claimed in claim 8 wherein at least one of the primary signal sources and the source separation system are located in a mobile vehicle.

13. The system as claimed in claim 8 wherein the characterization means comprise estimating means for making estimates of cumulants of the fourth order, and calculating means for calculating estimated coefficients for transforming the estimates of said cumulants into estimated mixing coefficients.

* * * * *